Aug. 29, 1944.  W. C. BARNES ET AL  2,356,968
RAIL FLAW DETECTING UNIT
Filed April 14, 1941
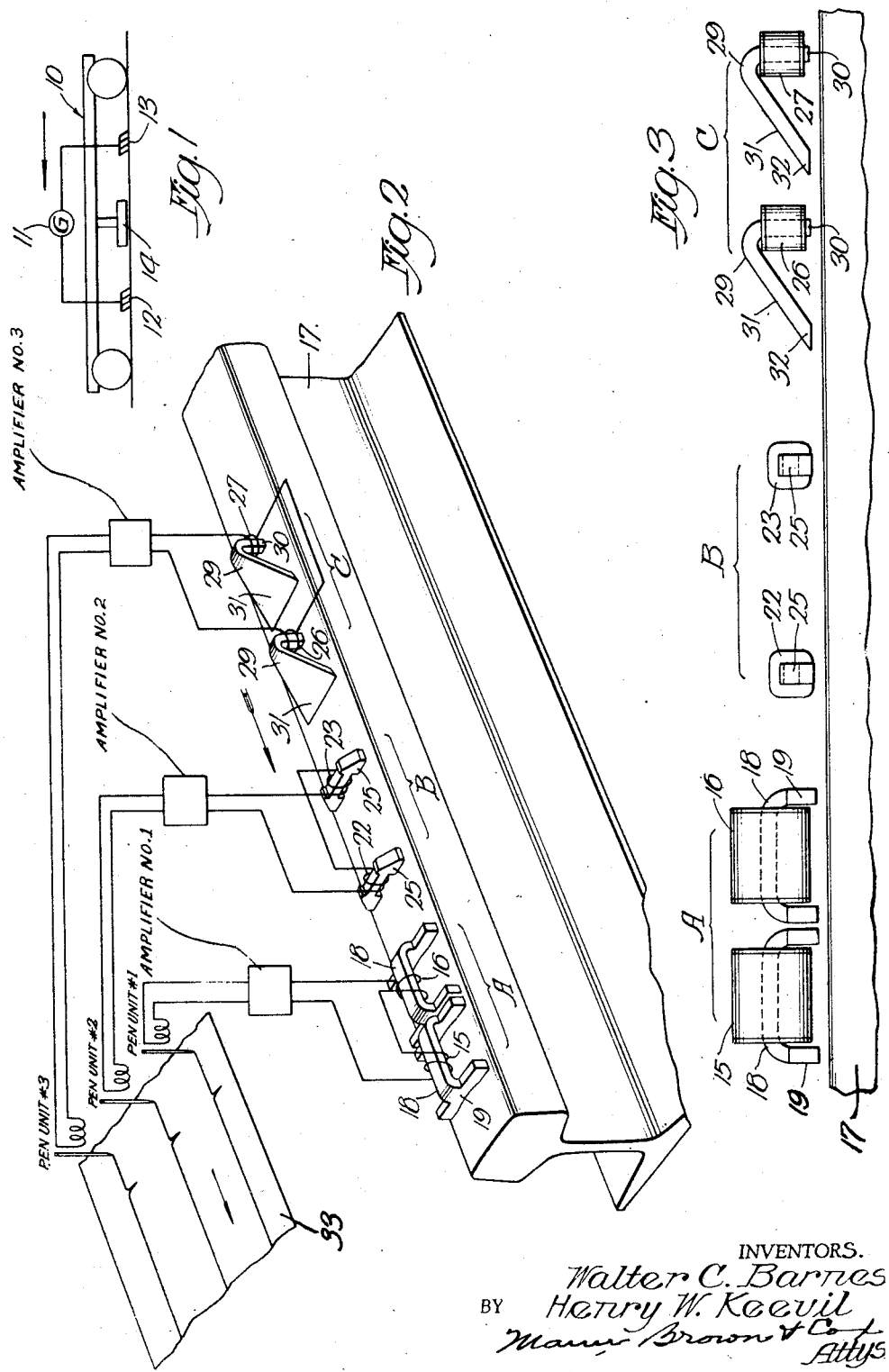
INVENTORS.
Walter C. Barnes
BY Henry W. Keevil Patented Aug. 29, 1944

2,356,968

UNITED STATES PATENT OFFICE 2,356,968

RAIL FLAW DETECTING UNIT

Walter C. Barnes, Lake Bluff, and Henry W. Keevil, Highland Park, Ill.

Application April 14, 1941, Serial No. 388,389

6 Claims. (Cl. 175—183)

This invention relates to improved apparatus for detecting flaws in railroad track.

In the electro-inductive system of detecting flaws in rail, a relatively strong unidirectional electrical current is progressively passed through sections of the rail, and a detecting coil is moved adjacent to the rail head at uniform speed to locate variations in the electromagnetic field set up by the current around the rail, such variations usually occurring when there is an internal defect of some kind in the rail.

A great deal of difficulty has been encountered, however, in the practical testing of rails by this method due to the fact that surface conditions often produce the same type of an indication that is caused by an internal defect. Such surface conditions may consist of grease spots on a rail, flowed rail, shelly rail, wheel burns, and the like, and it has always been a problem to differentiate the false indications produced by such surface defects from the true indications set up by fissures.

The principal object of this invention is to provide a detecting apparatus particularly useful with the electro-inductive system of testing which will enable the greatest number of flaw indications to be recorded by the apparatus and at the same time differentiate between those indications produced by internal fissures and those caused by surface defects.

Further and other objects and advantages will become apparent as the disclosure proceeds and the description is read in conjunction with the accompanying drawing, in which Fig. 1 is a diagrammatic view illustrating the electro-inductive method of detecting flaws in rail;

Fig. 2 is an enlarged perspective view of the detecting apparatus of this invention including the recording apparatus; and Fig. 3 is a side elevational view showing the relationship between the various components of the detecting apparatus.

The selection of a preferred form of the invention for the purpose of disclosure should not be construed as imposing unnecessary limitations upon the appended claims.

In testing rails for flaw by the electro-inductive system, a rail car diagrammatically indicated at 10 is employed which carries a high amperage, low voltage direct current generator 11 adapted to progressively pass strong unidirectional electrical current through the rail by means of brushes 12 and 13. Between the brushes, a suitable detecting apparatus 14 is mounted to explore the electromagnetic field set up by the current and to indicate any variations therein. The electro-inductive system of testing is sufficiently well known in the art to require no further description of its essential details. The present invention is directed to the detecting apparatus 14.

In the preferred form of the invention, the detecting unit comprises two pairs of primary detecting coils, one pair being indicated at A and the other pair being indicated at B. A pair of auxiliary coils, generally indicated at C, is also used for reasons that will hereinafter appear.

The coils 15 and 16 of the A pickup are positioned longitudinally of the rail 17, and the cores 18 extend through the coils and terminate in laterally extending arms 19. The coils 15 and 16 are connected in series opposition, and their combined output goes through amplifier #1, which in turn feeds into pen unit No. 1. In the present instance, the cores 18 of the longitudinal or A pickup are preferably 1¾" in length and are spaced apart about 1/16". The coils 15 and 16 each have 1500 turns of No. 38 enameled wire. Further disclosure of the A pickup and its characteristics may be found in Keevil Patent No. 2,089,967.

The B pickup consists of coils 22 and 23, which are positioned transversely of the rail and are connected in series opposition through amplifier #2 to pen unit No. 2. Each of the coils 22 and 23 is provided with a core 25 which lies transversely of the rail, and preferably the two cores are 1⅜" long and are spaced apart a distance of approximately 2¾". The coils 22 and 23 may each have 1000 turns of No. 38 enameled wire, this particular winding having been found to give satisfactory results.

The C pickup comprises coils 26 and 27 which are also connected in series opposition and lead to amplifier #3 which in turn feeds pen unit No. 3. Each of the coils 26 and 27 is provided with a core 29, which has a small portion 30 extending upwardly through the coil and a fan-shaped portion 31 extending longitudinally of the rail with its extremity 32 at about the same level as the lower extremity of the core portion 30.

Preferably, the coils 26 and 27 have 1500 turns of No. 39 enameled wire. A fuller disclosure of the construction advantages of pickups employing a vertical coil may be found in our copending application, Serial No. 320,704, the disclosure of which is hereby incorporated by reference.

All of the cores used with the detecting coils are made of high quality silicon iron or equivalent material, and other detailed information concerning the preferred dimensions of the cores, relative spacing, and the like, are indicated in the drawing.

The three pen units cooperate with the moving tape 33 to produce a record that is constantly before the car operator. He normally sits at the rear of the car where he may observe the rail and determine whether the indication was produced by an obvious surface defect or was probably caused by an internal fissure.

In practicing the invention, the primary detecting unit, consisting of pickups A and B, is relied upon for ordinary testing conditions because it has been found that these two pairs of coils will effectively detect almost all types and locations of internal fissures. Under some conditions, however, particularly where the rail is shelly, badly flowed, or has a large number of wheel burns, pickups A and B cannot be relied upon to locate fissures because they produce so many false indications that fissures are passed by because of the operator's mistaken judgment in believing that the true fissure indication was the result of a surface defect. It has been found that by using the auxiliary pickup C many conditions of rail which have hitherto prevented satisfactory testing of the rail now offer no real problem, because pickup C has the unusual characteristic of being reasonably sensitive to fissures but being almost totally insensitive to surface blemishes, such as wheel burns, shelly rail, flowed rail, and the like. Pickup C cannot be relied upon to the exclusion of pickups A and B in normal testing, because it is not as sensitive to fissures as the primary detecting apparatus consisting of pickups A and B, but when rail is encountered that prevents pickups A and B from doing their normal good job of locating fissures the operator can place greater reliance upon pickup C, and hence locate fissures in track which for practical reasons pickups A and B cannot differentiate from false indications.

It should be carefully noted, however, that pickups A and B are not alike in their responsiveness to certain types of false indications. For example, pickup A is relatively insensitive to magnetic spots in the rail, whereas pickup B will respond to many magnetic spots. Similarly, there are certain types of surface defects which pickup B will record as false indications and which pickup A will pass by without producing an indication. Hence, the car operator, knowing the characteristics of pickups A and B and knowing also that pickup C is generally insensitive to magnetic spots, wheel burns, and shelly rail, can discern from the record made on the tape 33 whether a particular combination of indications produced by the three pen units when correlated with the rail condition that he can see is likely to be indicative of a fissure or more than likely caused by some surface defect or magnetic condition existing in the rail.

Hence, it follows that the use of the auxiliary pickup C with the primary detecting apparatus consisting of pickups A and B enables more fissures to be taken out of track than either the primary pickup or the auxiliary pickup could alone detect. This ability to locate fissures in territories where the rail conditions are bad has greatly improved the efficiency of cars of this type.

We claim:

1. In a rail flaw detecting apparatus having means for passing an electric current through a rail, a detector for indicating the character of irregularities in the rail by selective response to certain irregularities in the magnetic field created by said current, said detector comprising a coil having a core with two poles spaced along the rail and with one pole substantially wider than the other.

2. In a rail flaw detecting apparatus for rail which is in an energized state producing a magnetic field adjacent thereto, a detector for indicating the character of irregularities in the rail by selective response to different irregularities in said magnetic field including a coil having a two-pole core with its poles spaced longitudinally along the rail, and with one pole substantially wider than the other transversely of the rail.

3. In a rail flaw detecting apparatus for rail which is in an energized state producing a magnetic field adjacent thereto, a detector for indicating the character of irregularities in the rail by selective response to different irregularities in said magnetic field including a coil having a two-pole core with its poles spaced longitudinally along the rail, and with one pole substantially wider than the other transversely of the rail, and a winding wound about a substantially vertical axis through the smaller of said poles.

4. In a rail flaw detecting apparatus for rail which is in an energized state producing a magnetic field adjacent thereto, a detector for indicating the character of irregularities in the rail by selective response to different irregularities in said magnetic field including a coil having a two-pole core with its poles spaced longitudinally along the rail, and with one pole substantially wider than the other transversely of the rail, and also of greater extent longitudinally of the rail.

5. A pick-up device including a core having a large pole and a small pole and having a coil on the core, the large pole portion having an inclined body and having its pole face cut horizontally in a longitudinal direction, whereby the area of the pole face is greater than the cross sectional area in a plane perpendicular to the body of the pole portion.

6. A pick-up device adapted to be moved along a body being tested including a core having a first leg terminating in a large pole and a second leg forming a continuation of the metal in the first leg and terminating in a small pole, and having a coil on the core, the small pole and the leg extending therefrom through the coil being so shaped as to permit removal of the coil therefrom and hence application of a pre-wound coil thereto, and said large pole being much greater in cross section than the cross section of said core portion, said poles being spaced along the body in such manner that the magnetic path of greatest permeance from the body through the large pole and through the leg terminated by it and back to the body is that path which extends also through the small pole, whereby there will be a tendency for the majority of the flux to pass through said coil.

HENRY W. KEEVIL.
WALTER C. BARNES.